C. T. A. H. WIEDLING.
PROPELLER.
APPLICATION FILED AUG. 1, 1908.

1,127,143.  Patented Feb. 2, 1915.
5 SHEETS—SHEET 1.

Witnesses:
Robt. G. Wuncke
M. W. Holt

Inventor
C. T. A. H. Wiedling
By Attorneys Munn & Co.

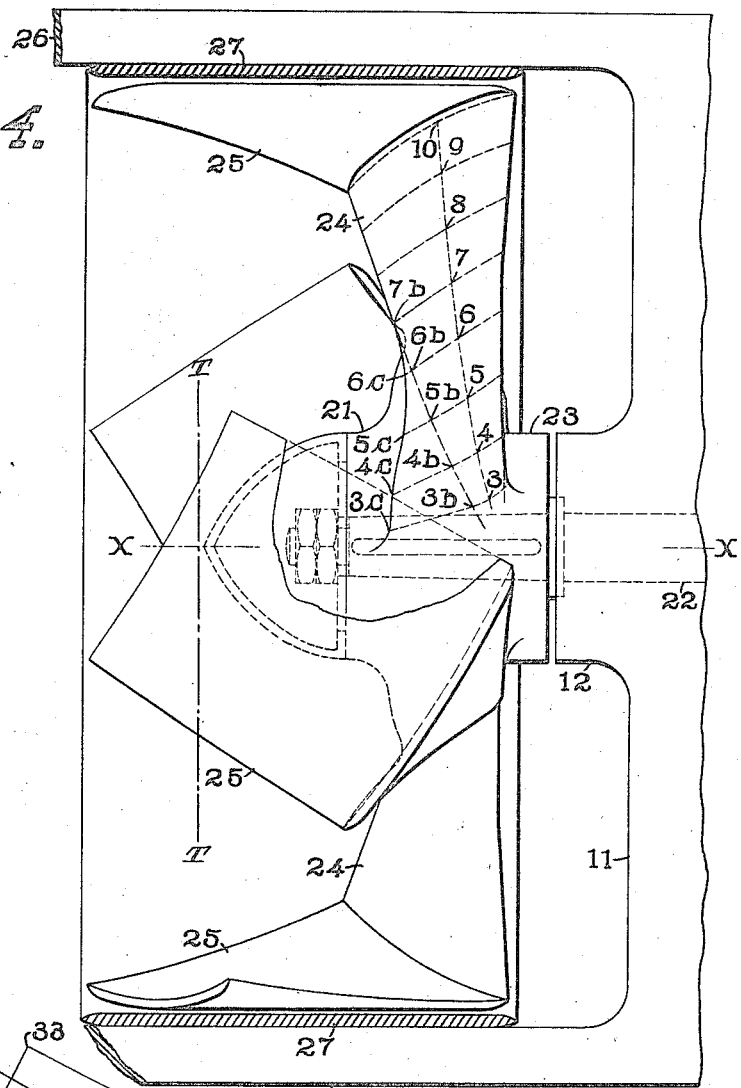
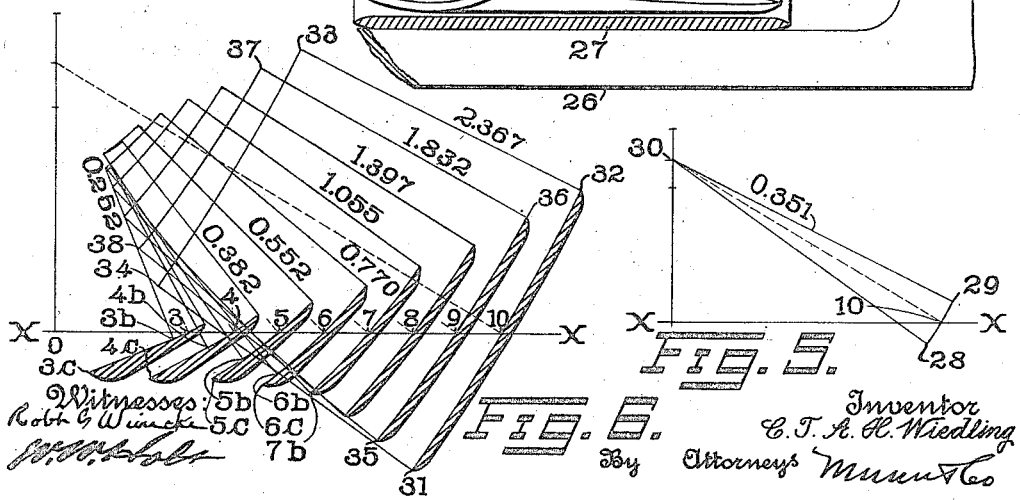

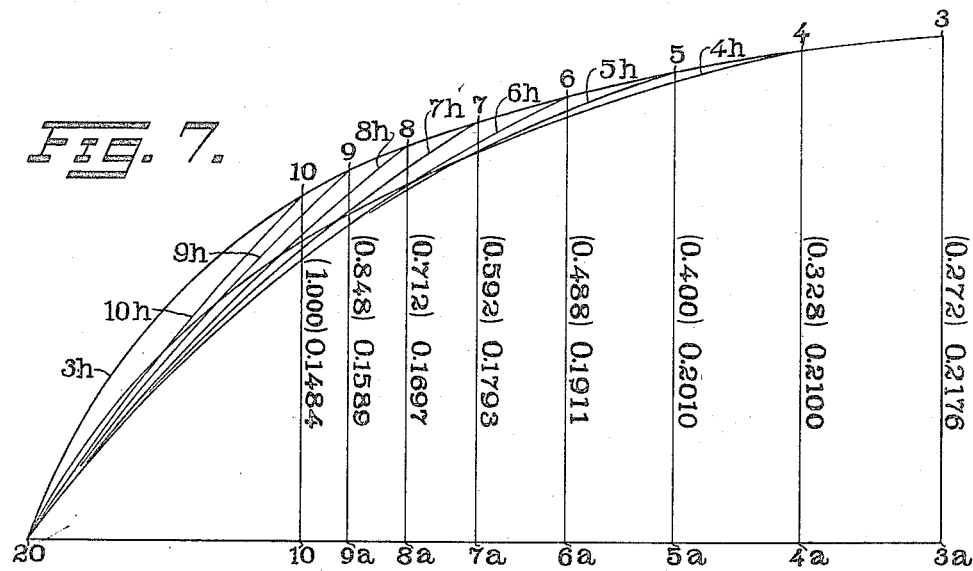
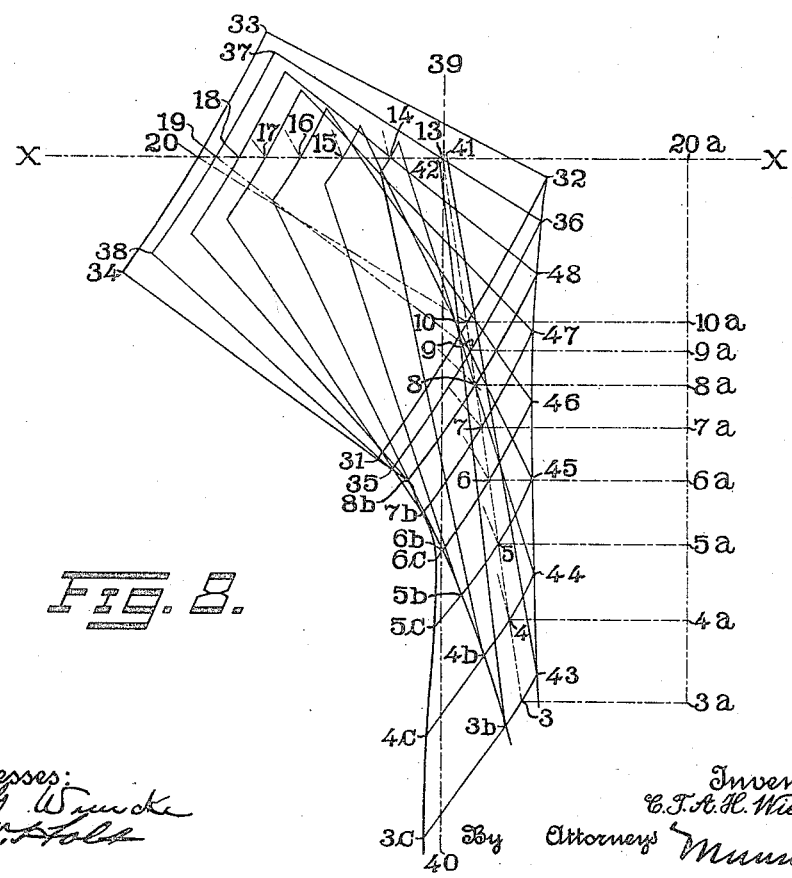

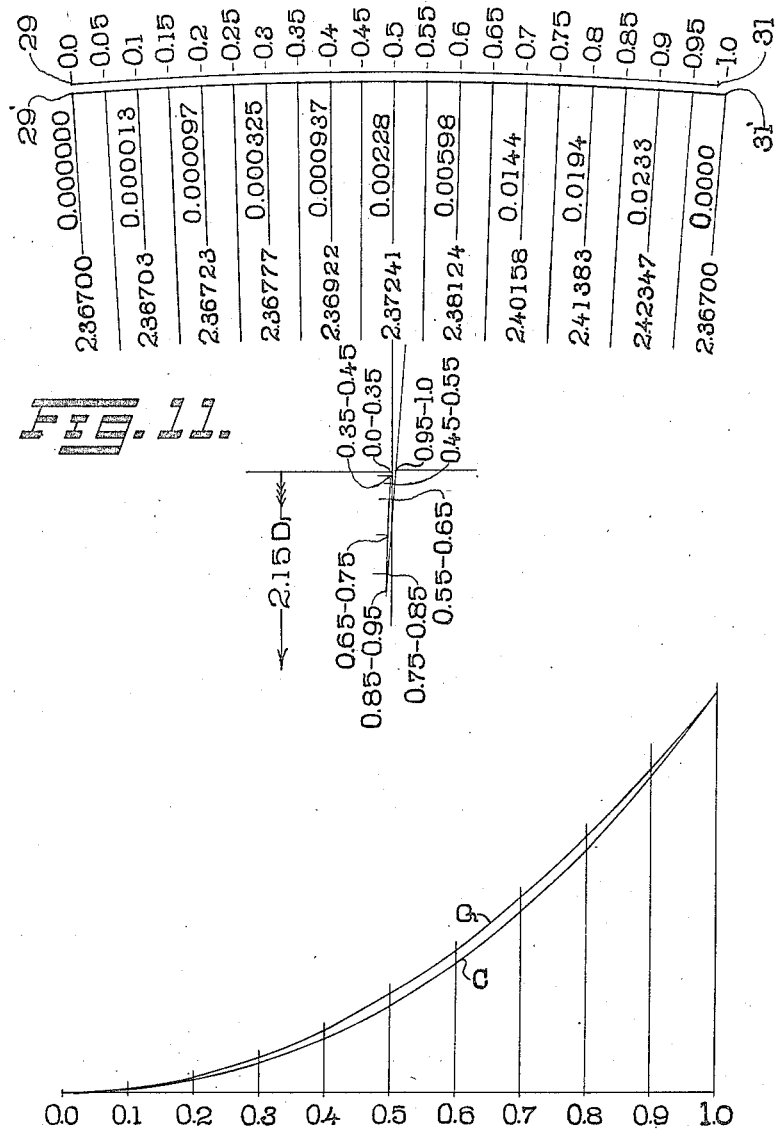

UNITED STATES PATENT OFFICE.

CARL THEODOR AUGUST HERMANN WIEDLING, OF NORTH BERGEN, NEW JERSEY, ASSIGNOR TO THE WIEDLING MANUFACTURING COMPANY, OF NORTH BERGEN TOWNSHIP, NEW JERSEY, A CORPORATION OF NEW JERSEY.

PROPELLER.

1,127,143.  Specification of Letters Patent.  Patented Feb. 2, 1915.

Application filed August 1, 1908. Serial No. 446,471.

*To all whom it may concern:*

Be it known that I, CARL THEODOR AUGUST HERMANN WIEDLING, a citizen of the United States, and a resident of North Bergen, in the county of Hudson and State of New Jersey, have invented a new and Improved Propeller, of which the following is a full, clear, and exact description.

The invention relates to rotary propellers for ships, balloons, flying machines and similar vehicles, and it is also of equal usefulness for other devices and machines, like turbine motors for steam, water, wind, air or gas power, or like turbine pumps, turbine air compressors, blowers and fans.

The object of my invention is to secure a greatly increased power efficiency and to reduce vibrations.

To enable others, skilled in the art, to make and use my invention, I will now describe it, by reference to the accompanying five sheets of drawings, in which—

Figure 1:
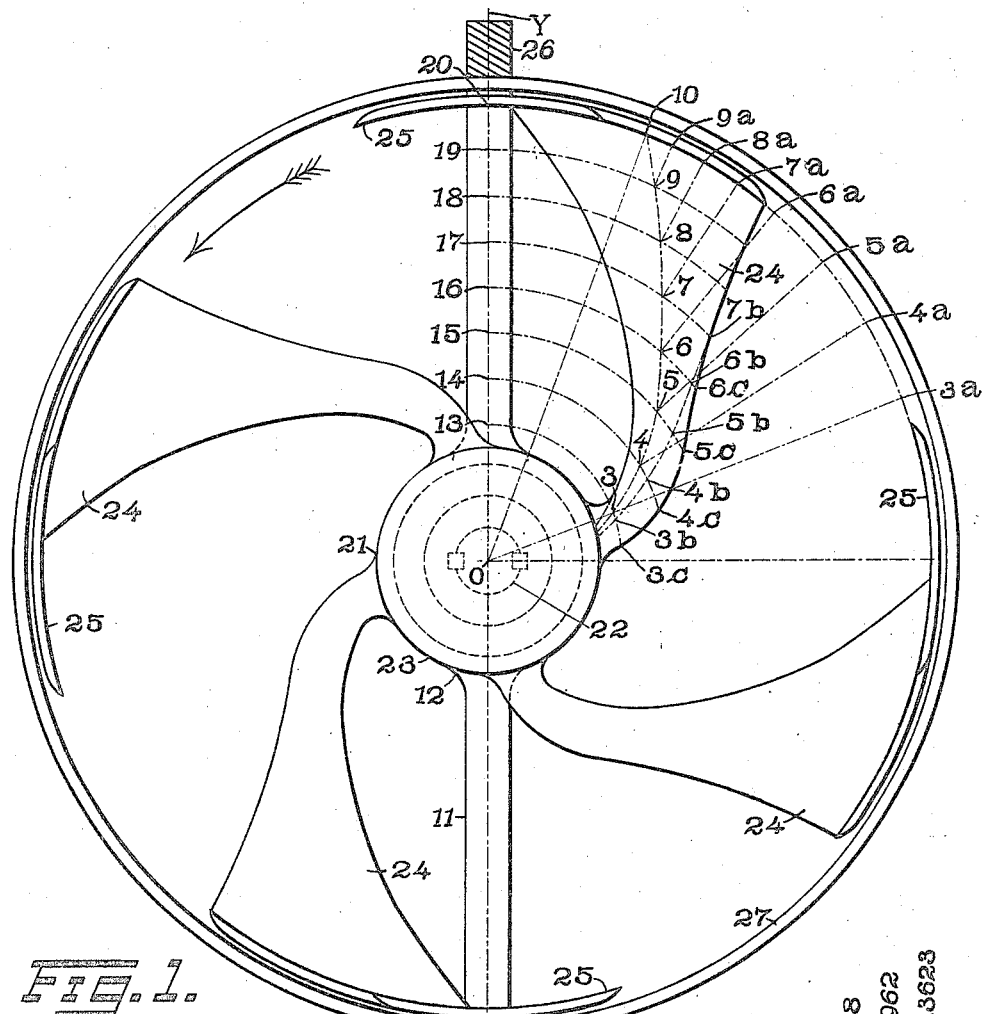
Figures 2, 3:
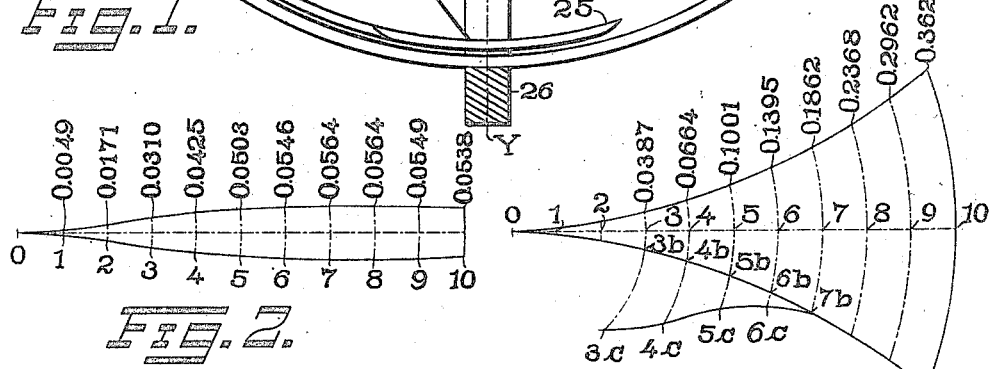
Figure 9:
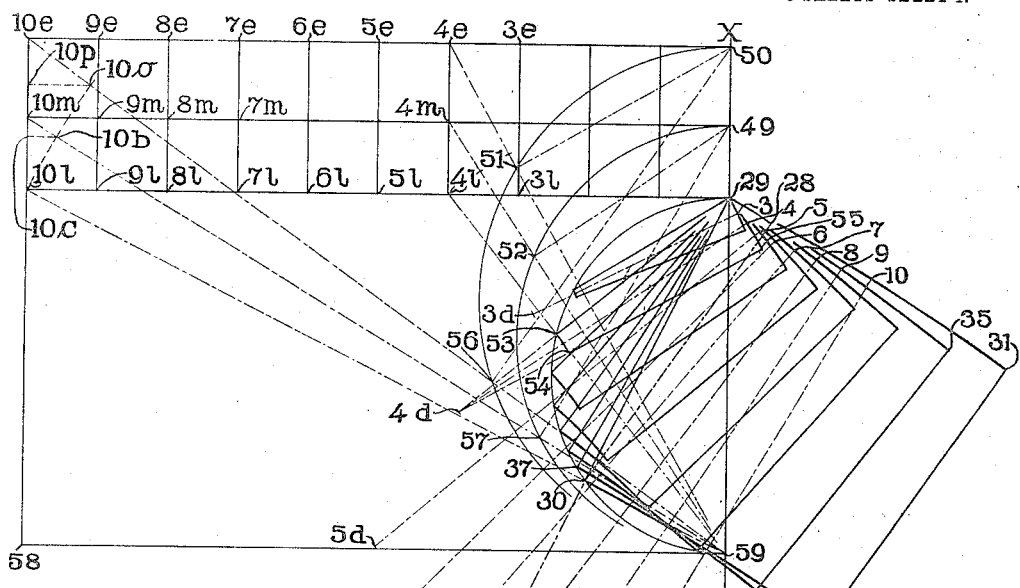
Figure 10:
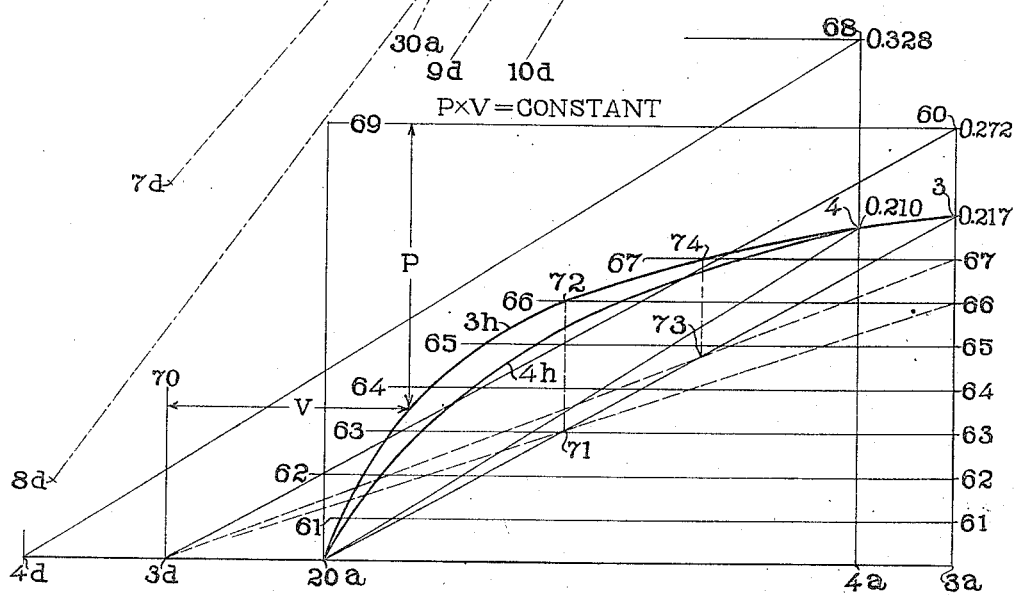

Figure 1 is a stern view of my propeller, as it would appear in an installation for the propulsion of a ship or flying machine; Fig. 2 is a view, in plane development, of one of the blades of my propeller, with four blades, giving the correct least widths required, as found by calculation; Fig. 3 is a view, in plane development, of one of the blades of my propeller, with four blades, wherein the widths, at the different radii, are made in a progressive multiple of the least widths, of Fig. 2, and which corresponds, in size, to the blades shown in all the figures, except Figs. 2 and 5; Fig. 4 is a starboard view of my propeller, in which one-half of the stationary shrouding is removed and shown in cross section on dotted lines Y—Y of Fig. 1; Fig. 5 shows, in plane development, the cross sectional line of the driving face of the propeller blade, at the outer radius of the propeller and corresponding to the least blade width required, as per Fig. 2; it also shows the degree of the angular position of this blade section in reference to the axis of the propeller, the direction of which is indicated by line X—X, and it further shows in plane development of the co-axial cylindrical cross section, the area of the water current, which is subject to dynamic pressure; Fig. 6 is a diagram, showing in plane development the co-axial cylindrical cross sections of the propeller blade at the different radii, from the axis of the propeller, as indicated in circular arcs in Fig. 1; it also shows the degree of the angular position of these sections, in reference to the axis of the propeller, the direction of which is indicated by line X—X, however, without showing them in their true relative position; further, Fig. 6 shows in plane development, the co-axial cylindrical cross sections of those portions of the water current, which are subject to dynamic pressure and which pertain to the blade sections at the different radii of Fig. 1; Fig. 7 is a diagram of the pressures generated by the deflection of the water current within the entire range of the driving face of the propeller blade at the different distances from the driving face of the blade and at the different radii of the propeller and throughout the co-axial cylindrical cross sectional areas of dynamic pressure, pertaining to the different blade sections; this diagram refers particularly to the wide blades, shown in Figs. 1, 3, 4, 6, 8 and 9, and not to the blade of least width, shown in Figs. 2 and 5; Fig. 8 is a diagram of the co-axial cylindrical cross sections at the different radii of the propeller of the driving face of the blade and that portion of the water current which is under dynamic pressure, in plane development of the normal radial projection of all these sections and of the whole blade on the outer cylindrical surface at radius 10 of the propeller; Fig. 9 is a diagram for the graphical determination of the angular position of each of the blade sections of the widths of the driving face thereof and of the velocities of the water current at the different radii corresponding to those sections; and Fig. 10 is a diagram explaining the graphical determination of the radii of curvature of the driving face of the blade and showing also a convenient method for the construction of the equilateral hyperbolical curves of the pressure diagram. Fig. 11 is a diagram, showing in double scale of the other figures, the construction of the cross-sectional driving face line at radius 10 of the propeller. Fig. 12 is a diagram, indicating the centrifugal action due to the true circumferential velocity of the water current at radius 10 of the propeller.

The ship propellers and other propellers in use at present are very inefficient, mainly due to pressure losses, caused by the motion of the water current, radially outward as well as radially inward while within active range of the driving face of the blade. This radial motion, in well-proportioned propeller blades, is almost entirely due to the dynamic pressure, generated by the deflection of the water current through the pitched driving face of the blade, and only to a slight degree due to the centrifugal action caused by the partial rotation of the water with the propeller. This is evident in the diagram (Fig. 9), by which is shown later on that the circumferential velocities imparted to the water current in passing through the propeller, which cause the centrifugal action, are very small in comparison with the velocities of the water current to which are due the dynamic pressures generated in the driving faces of the blades. Avoidable loss of efficiency of a lesser degree is also due to surplus friction of the water current on the propeller blades of much larger widths or area than required either for strength or effect. Other losses are caused by the faulty cross sectional form of the blades, either by the use of blades of true and uniform helical pitch surface, or through the faulty curvature of the driving face of the blade or the back thereof, or through the faulty location axially or circumferentially of the cross sections of the blade at the different radii.

I have found through experimental and mathematical research that the ideal propeller is one in which the stream lines of the water current while within the range of action of the driving face of the blade, are guided within lines of constant distance from the axis of rotation of the propeller, or within cylindrical surfaces, concentric with the axis of the propeller. Further, in this manner, I have found that for maximum efficiency the pitch at the leading edge of the propeller blade must be equal at all radial distances from the axis of rotation; further, the pitch velocity at the leading edge of the blades must be made equal to the relative axial velocity of the water current, so as to lead the latter into perfect tangential contact with the driving face of the blade. By "pitch velocity" I mean the velocity with which any point though stationary circumferentially and radially will travel in a straight axial direction, while remaining in contact with the driving face of the propeller in motion. Further, I have found that the blades of the propeller must be made of a pitch increasing from the leading edge to the rear edge, or in other words, the driving face of the blades must, in any cylindrical cross section concentric with the axis of the propeller, appear, in plane development thereof, as a curve, concave at the driving face. Further, I have found that the degree of curvature of the driving face of the blade in the co-axial cylindrical cross section thereof affects the performance of the propeller greatly and that the radius of curvature of any portion thereof must be at least equal to the relative width of the water current, passing between adjacent blades.

By the relative width of the water current I means the width of the water current as measured on a line normal to the cross-sectional line of the driving face of the blade at the leading edge, and this width is a function of the pitch angle of the leading edge of the driving face of the blade and the circumferential width of the water current in a plane cross-section normal to the axis of the propeller and passing through the leading edge of the blade section. The circumferential width of the water current in a plane cross-section normal to the axis of the propeller and through the leading edge of any blade section is equal to the circumferential distance from the leading edge of one blade section to the leading edge of the adjacent blade section at the same radial distance from the axis of the propeller. Denoting the radial distance of the similar cross-sections of the driving faces of two adjacent blades by $r'$, the number of uniformly spaced propeller blades by $n'$, and the pitch angle of the leading edge of the cross-section of the propeller blade by $\alpha$, then the width of the water current $w$, for any point of the leading edge of the blade, and within a plane normal to the axis of the propeller is—

$$w = \frac{2\pi r'}{n'},$$

and the relative width W of the water current for the same blade section is $$W = w \times \sin. \alpha,$$

or $$W = \frac{2\pi r'}{n'} \sin. \alpha$$

A graphical method of obtaining the relative widths of the water current is explained farther on in reference to the diagram, Fig. 9. On this basis, I have found, that highly efficient propellers can be constructed with comparatively narrow blades, and that in most cases the blade widths must be selected for the purpose of sufficient strength and keenness of cross section rather than for the purpose of gripping the water current.

Further, I have found, that by means of the correct selection of the curvature of the driving face of the blade in the co-axial cylindrical cross sections thereof, the dynamic pressures generated through the deflection of the water current, can be amended and controlled so as to very closely balance the varying dynamic pressures in the different layers of the water current, in radial directions. Further, I have found, that the additional pressure generated in the water current, by the partial circumferential motion of the water with the propeller can be compensated for by the gradual reduction of the curvature of the driving face of the blade from the leading edge and from the edge of egress, to the point of maximum centrifugal pressure, along the line of the driving face, in the plane development of the co-axial cylindrical cross sections thereof.

Further, I have provided my propeller with suitable shrouding of the blades and with stationary shrouding, to completely prevent the escape of water from the current under dynamic pressure to the outside of the circumference of the propeller, and to prevent interference due to side waves. Finally, I have combined these features of my invention into a very practical and highly efficient form of a propeller, which is adapted to suit all conditions found in general practice.

In all of the drawings, the figures of reference, from 0 to 10, indicate the relative radial distances of the blade sections, from the axis of rotation of the propeller and the axis of the latter is indicated by lines X—X in Figs. 4, 5, 6, 8 and 9.

In Figs. 1 and 4—11 is the stern frame and 12 the stern bearing of a ship, flying machine or other device to be driven by the propeller 21. The propeller shaft 22 is journaled within the stern bearing 12 and is secured, on its outer end, within the hub 23 of the propeller, which latter is provided with the four propeller blades 24, each of which has, on its outer edge, a shrouding 25 of cylindrical curvature, corresponding to the outer radius of the propeller blade.

Concentrically surrounding the propeller and attached to the branches 26, 26 of the stern frame 11 is located the stationary cylindrical shrouding 27.

The propeller exemplified is of left-hand pitch, and has a pitch of 1.57 times its outer diameter, at the leading edges of the driving faces of blades, which are of increasing pitch rearwardly, so as to give a pitch of 2.23 times the outer diameter of the propeller, at the rear edge of the driving faces of blades, or a mean pitch ratio of 1.885 along the median longitudinal line of the active portions of the driving faces of the blades. The mean pitch ratio is obtained from the mean pitch angle of the outer cross-section of the driving face of the blade. The pitch ratio of 1.57 at the outer leading edge of the blade, corresponds to a pitch angle of 26° 33′ 54″, the tangent of which is 0.5; the pitch ratio of 2.23, at the rear outer edge of the blade corresponds to the pitch angle of 30° 21′ 46″, the tangent of which is 0.7097. Therefore, the mean pitch angle of the outer edge of the driving face of the blade is 30° 57′ 50″, the tangent of which is 0.6 and to which corresponds the pitch ratio of 1.885. These pitch ratios correspond to a total deflection of the water current, at the outer radius of the propeller, of 8° 47′ 52″, which is excessive for cases requiring high power economy. However, I have adopted herein these proportions of pitch, with the greater width of blade due to same, for the purpose of greater clearness of the drawings pertaining hereto. The arrow on the upper left of Fig. 1 indicates the direction of rotation of the propeller for the forward motion of the ship.

The blades 24 of the propeller are curved in a helically pitched spiral of opposite helical and the same spiral pitch as the pitch of the driving face of the propeller blades, as is evident in Figs. 1, 4 and 8; or in other words, the blades of the propeller with driving faces of left-hand pitch, as shown herein, are curved in a helically pitched spiral of right-hand helical and left-hand spiral pitch. Otherwise, in a propeller with driving faces of right-hand pitch, the blades are curved in a helically pitched spiral of left-hand helical and right hand spiral pitch.

I have found that the ideal propeller, in which the water current is not subject to centripetal or centrifugal motion, requires very narrow blades only, to completely and perfectly act on the water passing through the propeller.

In a four-bladed propeller, of the pitch shown in Figs. 1, 4, 6 and 9, and mentioned dimensionally hereinbefore, I have found that the ideal blade would have to be of a width of 0.056 times the outer diameter of the propeller at its widest part, near radii 7 and 8, of Fig. 2, in which the ideal widths are indicated in decimal fractions of the outer diameter of the propeller and in chord measure of the driving face lines in the plane development of the co-axial cylindrical cross sections of the driving face of the blade, at the different radii, and not in arc measure. The method of deriving the numerical values for these ideal widths is explained in connection with Fig. 9. However, these narrow blades can not, in most cases, be used actually, for the reason of lack of strength or when sufficiently strong, for lack of the keenness of cross section so very essential in propeller design. Therefore, and for another very important reason, which is stated hereafter, I have selected for the blades of the propeller a width which is a multiple, progressive with the different radii of the propeller of the least widths, shown in Fig. 2.

Fig. 3 shows in plane development one of the blades of my propeller, in which the width at each one of the different radii is a multiple the values of which will be given in what follows, progressive with the radii of the propeller of the least blade widths of Fig. 2, and which is adopted in the Figs. 1, 4, 6, 8 and 9. The decimal figures in Fig. 3 refer to the outer diameter of the propeller as a unit and indicate the blade widths at the different radii, in chord measure, of the driving face lines, in the plane development of the co-axial cylindrical cross sections of Fig. 6.

In the diagram, Fig. 5, is shown in plane development of the co-axial cylindrical cross section, the ideal propeller blade 28—29, corresponding to the least width at radius 10 of Fig. 2. The driving face 10 thereof is of the circular curvature, described by radius 30—29, which latter is made equal to the relative width of the water current, as measured normally to the arc 28—29, at the point 29 or equal to 0.351 of the outer diameter of the propeller. Therein, the sector 28, 29, 30, represents the cross sectional area under pressure, which is generated by the deflection of the water current, from the relative direction, normal to radius 29—30, to the relative direction, normal to radius 28—30.

I have found, that in an ideal propeller, in which the stream lines of the water current are maintained at a constant distance, from the axis of rotation of the propeller, and in which the water current is deflected by a driving face of circular curvature, of a radius equal to or less than the relative width of the water current pertaining to the blade section, that the pressure generated within the sectional area of dynamic pressure, is equal, or very nearly equal, throughout the said sectional area of dynamic pressure. The water current, after reaching the line of entrance 29—30, Fig. 5, and in being guided in circular stream lines around the center 30, receives gradually an increasing circumferential velocity, in the direction of the rotation of the propeller, around its axis. This circumferential motion subjects the water current to centrifugal action in the direction normal to the axis of rotation of the propeller and thereby an additional pressure is generated within the sectional area of pressure 28, 29, 30. However, in propellers in which the water current is deflected only to a small degree, or in propellers working with little slip, this additional pressure is very small in comparison with the dynamic pressure generated by the deflection of the water current through the cross sectional curvature of the blade. Neglecting the pressure, generated by the partial motion of the water current, around the axis of the propeller, the pressure generated is that due to the circular motion of the water current around the center 30, and is equal throughout the sectional area 28, 29, 30, or $$P = \frac{V^2}{g} D,$$

in which equation P denotes the pressure generated per unit area, $g$ the acceleration due to gravity, D the density of the water or other medium in weight per unit volume, and V the relative velocity of the water current.

In the propeller having the cross sectional lines of the driving face of the blades, curved on radii, equal to the relative width of the water current, I prevent the radial outward flow of the water completely by providing the blade at its outer edge with a shrouding corresponding in form and size to the outer circumferential area of dynamic pressure, or to the sectional surface 28, 29, 30, of Fig. 5. However, in this propeller, the circumferential areas of dynamic pressure, pertaining to the smaller radial distances from the axis of rotation of the propeller, are subject to considerably less dynamic pressure than those of larger radius overlapping them, and thereby the water current within the range of the driving face of the blade suffers considerable deflection from its true path of constant distance from the axis of rotation of the propeller, by flowing toward the areas of lower pressure located nearer to the axis of rotation. This centripetal flow of the water current reduces the dynamic pressure at the outer radii of the propeller and increases the pressure at the inner radii thereof sufficiently so as to cause there the discharge of part of the water current forwardly as well as rearwardly, and thereby the regular inflow of water at the inner radii is completely prevented. Consequently the efficiency of the propeller, although augmented, is not as high as possible or desirable.

To further increase the efficiency of my propeller, I reduce the cross sectional curvature of the driving face of the blade, by making the radii of curvature thereof a multiple, progressive with the radii of the propeller, of the relative widths of the water current. This is explained by means of the diagram, Fig. 6, which represents in plane development the co-axial cylindrical cross sections of the propeller blade and of the areas of the water current, subject to dynamic pressure, which correspond to the radii indicated in Figs. 1 and 4, by the reference figures 3, 4, 5, 6, 7, 8, 9 and 10.

In Fig. 6, the radius of curvature of the driving face of the blade at section 9 is made equal to 1.25 times the relative width of the water current, pertaining thereto; the radius of curvature of the driving face of the blade section 4 is made equal to 1.562 times the relative width of the water current pertaining thereto. The radii of curvature of the driving face lines of the other blade sections are made the following multiples of the relative width of the water current, pertaining to each: 1.99 times for section 5; 2.55 times for section 6; 3.3 times for section 7; 4.196 times for section 8; 5.337 times for section 9, and 6.739 times for section 10. The decimal figures on the radial lines of Fig. 6 indicate the length of the radius of curvature of the driving face line of each blade section, wherein the outer diameter of the propeller at radius 10 is referred to as the unit. This is more clearly explained hereinafter.

A change of the radius of curvature of the driving face involves a corresponding change of the width of the blade, whenever it is the intention to retain the degree of the leading pitch and the pitch of egress. Therefore, the widths of the blade sections of Figs. 3 and 6 are made a multiple of the least blade widths of Fig. 2, which multiple in each instance is the same as that used for the augmentation of the radius of curvature of each blade section. In this way, the cross sectional line 31, 32 of the driving face at radius 10 of the blade, Fig. 6, is made 6.739 times as long as the cross sectional line 28, 29 of the driving face of least width at radius 10, Fig. 5, etc.

In Fig. 6, the cross sectional areas of dynamic pressure appear as truncated sectors, of which 31, 32, 33, 34 is the outer area of dynamic pressure, pertaining to blade section 10, and showing at the same time the form and size of the shrouding 25 of the propeller blades, of Figs. 1 and 4. Similarly, the truncated sector 35, 36, 37, 38 represents the cross sectional area of dynamic pressure, pertaining to blade section 9, etc. In the above instance, the cross sectional areas of dynamic pressure appear as truncated sectors, for the reason that the centers of curvature of the driving face lines are located outside of the water current, because these radii of curvature are made larger than the relative width of the water current, for the purpose of regulating the dynamic pressures of the water current, as explained in the formulas given hereinafter. The width of the blade sections 3, 4, 5 and 6 is made greater than the width of the driving face thereof, by the addition to each of these sections, of an idle face of true helical pitch, in continuation of the pitch of egress of each of these blade sections.

The straight line 3b, 3c, Fig. 6, is tangent at the point 3b to the curve of the driving face, pertaining to blade section 3; the straight line 4b, 4c is tangent at point 4b to the curve of the driving face of the blade section 4, etc. These straight lines represent in the plane development of the coaxial cylindrical cross sections, the true helical pitch lines of the idle face of the blade, which is added to the regular driving face for the purpose of sufficient strength, of the blade near the hub of the propeller, without increasing the pitch of egress, or without impairing the keenness of the cross section of the blade. The width and cross sectional curvature of the blades of the propeller shown in Figs. 1 and 4 correspond in all respects to those of the blade sections of Fig. 6, and the area 7, 3, 3c of the blade of Figs. 1 and 4 represents the idle face, added to the driving face, as explained above.

In the cross sectional areas of pressure, 31, 32, 33, 34 and 35, 36, 37, 38, etc., of Fig. 6, the dynamic pressure generated by the deflection of the water current is not equal throughout the surface of each truncated sector, as in the full sector area 28, 29, 30 of Fig. 5, but decreases gradually from the driving face of the blade toward the apex line of the truncated sectors, although the dynamic pressure is constant within any of the stream lines of circular curvature, concentric with the arc of curvature of the driving face of the blade. I have found that the dynamic pressure within any stream line, of a liquid current subject to circular deflection, is a fraction of the full pressure, $$P = \frac{V^2}{g}D,$$

equal to the quotient of the radial distance of the stream line, from the apex line of the truncated area of dynamic pressure, and the radius of curvature of said stream line, or $$P_1 = \frac{V^2}{g}D\frac{R_2}{R_1} = P\frac{R_2}{R_1},$$

wherein $P_1$ denotes the dynamic pressure per unit area, within the stream line;

$$\frac{V^2}{g}D = P,$$

the dynamic pressure generated by the circular deflection of a water current of a width equal to the radius of curvature of the deflection surface; $R_1$ the radius of curvature of the stream line, and $R_2$ the radial distance of the stream line from the apex line of the truncated area of dynamic pressure.

Hereunder I shall prove that the dynamic pressure is equal throughout the sector area 10, 28, 30, Fig. 5, and not equal throughout the truncated sector area 33, 34, 32, 31, of Fig. 6. I denote below the radius of curvature of the cross sectional line of the driving face of the blade by R and any lesser radius of curvature of a stream line of the water current within the area of dynamic pressure, by $R_1$; the radial distance of the area of pressure from the axis of the propeller by $r$; the velocity of the water current relative to the blade section by V; the density of the water or other medium by D; and the acceleration, due to gravity, by $g$.

Suppose a fine jet of water, of the width $dR$, and of the radial thickness $dr$, and of rectangular cross section, strikes the surface of the propeller blade tangentially at 29, Fig. 5, with the velocity V, and passes, frictionless and with uniform velocity, along the arc 28, 29, and is discharged tangentially at the edge 28 of the circular arc 28, 29 Fig. 5. Thereby the unit mass of water is subjected to centrifugal action $$C = \frac{V^2}{gR}$$

and the total centrifugal pressure of this jet, normal to the arc 28, 29 is then $$Cp = \frac{V^2}{gR} \times \text{arc } 28, 29 \times dR \times dr \times D. \quad (I).$$

This first jet of water forms a circular path for a similar second jet of water, which passes along with it, under the same velocity V, however at the lesser radius $R-dR$, etc. Throughout the whole range of the radius R, all other layers find a circular guide and bearing on the outer layers of fluid currents of larger radius. Any other jet of the radial width $dR$ traveling on a different or smaller radius than R, say on radius $R_1$, and on a shorter arc 28, 29', is subjected to greater centrifugal action in inverse ratio of the radii, or as $\frac{R}{R_1}$. The total centrifugal pressure in the latter case, on the arc 28', 29' is therefore $$Cp' = \frac{V^2}{gR_1} \times \text{arc } 28', 29' \times dR \times dr \times D. \quad (II).$$

However, the quotients $$\frac{\text{arc } 28, 29}{R}$$

and $$\frac{\text{arc } 28', 29'}{R_1}$$

are equal and constant, because the length of the arc diminishes in the same ratio as its radius. Therefore, the total centrifugal pressure $Cp'$ of any similar jet, of the width $dR$, and of any radius $R_1$, is constant, or $$Cp' = \frac{V^2}{gR} \times \text{arc } 28, 29 \times dR \times dr \times D. \quad (III).$$

Hence the total centrifugal pressure $Cp'$ on the arc 28, 29, due to the whole water current, of the width R and the radial thickness $dr$ is $$Cp' = \frac{V^2}{gR} D \times dr \times \text{arc } 28, 29 \int_0^R dR$$

or $$Cp' = \frac{V^2}{g} D dr \times \text{arc } 28, 29. \quad (IV).$$

From the latter equation, we get the dynamic pressure per unit area, $p$, which acts on the cylindrical surface $dr \times \text{arc } 28, 29$, by dividing the right hand side of this equation with the area $dr \times \text{arc } 28, 29$ thereof, or $$p = \frac{Cp'}{dr \times \text{arc } 28, 29} = \frac{V^2}{g} D \frac{dr \times \text{arc } 28, 29}{dr \times \text{arc } 28, 29}$$

or $$p = \frac{V^2}{g} D. \quad (V).$$

By means of equation (III) is proven that each $dR$ of the water current, no matter what the radius of the curvature of its motion, adds an equal increment of pressure on the surface, arc 28, 29 $\times dr$, therefore the unit pressure generated by a water current, of a radial width, less than R is less than that of equation (V) in ratio of the quotient of the radial dimension of the current and the radius of curvature of the cross sectional line of the driving face of the blade.

Denoting the radial width of the water current by $R_2$, and the dynamic pressure per unit area, in this case, by $p'$, we have $$p' = \frac{V^2}{g} D \frac{R_2}{R} \quad (VI),$$

which is the dynamic pressure per unit area of the driving face of the propeller blade of a cross sectional curvature of the radius R, which is greater than the width $R_2$ of the water current.

The same result is had by integrating equation (III) between limits R and $R_1$ and dividing by the area $dr \times \text{arc } 28, 29$, where $R_1 = R - R_2$, or the radius of curvature of the stream line of the water current at the apex of truncation of the truncated area of pressure, Fig. 6. In this way $$p' = \frac{V^2}{g} D \times \frac{\left(\frac{\text{arc } 28, 29}{R} dr \int_0^R dR\right) - \left(\frac{\text{arc } 28', 29'}{R_1} dr \int_0^{R_1} dR_1\right)}{\text{arc } 28, 29 \times dr}$$

or
$$p' = \frac{V^2}{g}D\left(1 - \frac{\text{arc } 28', 29'}{\text{arc } 28, 29}\right).$$

However,
$$\frac{\text{arc } 28', 29'}{\text{arc } 28, 29} = \frac{R_1}{R},$$

therefore
$$p' = \frac{V^2}{g}D\left(1 - \frac{R_1}{R}\right) \text{ and } R_1 = R - R_2$$

or
$$p' = \frac{V^2}{g}D\left(1 - \frac{R - R_2}{R}\right) = \frac{V^2}{g}D\frac{R_2}{R} \quad (VIa).$$

The above (VI) is the equation of an equilateral hyperbola, in reference to one of the asymptotes and a line parallel to the other asymptote as axis.

By means of equation (VI), the dynamic pressure $p'$ within any stream line of the truncated areas of dynamic pressure, in Fig. 6, can be calculated by inserting for $R_2$ the distance of the stream line from the apex line of truncation and for R, the radius of curvature of the stream line. Otherwise, for the purpose of generating a predetermined dynamic pressure on the driving face of the propeller blade, the pressure $p'$, and the width of the water current $R_2$, must be inserted in this equation, for finding the corresponding radius R of the cross sectional curvature of the driving face of the blade. The equilateral hyperbolical curves 3—20, 4—20, 5—20, etc., of the diagram of pressures, Fig. 7, have been calculated in this manner.

Through equation (V) it is evident that the dynamic pressure in the full sector area 28, 29, 30 is equal throughout, and the pressure at the apex 30 is the same as the pressure on the driving face 28, 29.

Through equation (VI) is demonstrated that the dynamic pressure at the apex line of truncation, of the areas of dynamic pressure, Fig. 6, is zero, and increases from there toward the driving face of the cross sections of the blade in a ratio, set forth in equilateral hyperbolical curves of the diagram of dynamic pressures, Fig. 7.

The degree of pressure within any stream line at any radial distance from the apex line of the truncated sectional areas of dynamic pressure, pertaining to the different radii of the propeller, is set forth in the diagram Fig. 7, which is explained herewith by reference to Figs. 1 and 8.

Fig. 8 shows the co-axial cylindrical cross sections at the different radii of the propeller, through the driving face of the blade and through the portions of the water current under dynamic pressure, in plane development of the normal radial projection of all these sections and of the whole blade, on the outer cylindrical surface at radius 10, of the propeller. In this manner the relative radial axial and circumferential position of these parts is made clearly evident. The dotted line X—X of Fig. 8 indicates the axis of rotation of the propeller, and at the same time the vertical axial plane on line Y—Y of Fig. 1.

In Fig. 8, 31, 32, 33, 34 is the truncated sector area of dynamic pressure, pertaining to blade section 10; 35, 36, 37, 38 the area of dynamic pressure, pertaining to blade section 9, etc., and 41, 42, 3b, 43, is the area of dynamic pressure, pertaining to blade section 3. The reference figures 13, 14, 15, 16, 17, 18, 19 and 20 indicate the middles of the apex lines, of the areas of dynamic pressure, all of which are located on the line, or axial plane X—X. This is a purely arbitrary construction, as explained in what follows. Like reference figures 13 to 20 indicate the location of the middle of the apex lines, of the areas of dynamic pressure on the vertical plane Y—Y of Fig. 1.

In Fig. 8, 3b, 31, 32, 43 is the driving face and 3b, 3c, 7b the idle face of the blade, the latter of which is similarly marked in Figs. 1 and 4. The straight dotted line 3—13, Fig. 8, is the middle radius of the area of dynamic pressure, pertaining to the driving face of the blade at radius 3, and points 4, 5, 6, 7, 8, 9 and 10 are the middle of the driving face lines, at the corresponding radii of the propeller. The line 39, 40 is normal to line X—X, and serves for the determination of the relative axial positions of the different blade sections. Line 3a—20a is also normal to line X—X and lines, 3,—3a, 4—4a, etc. to line 10—10a are parallel to line X—X. Therefore, the distance 3a—20a represents the circumferential component of the projected middle radial dimension 3—13 of the area of dynamic pressure 41, 42, 3b, 43, pertaining to the driving face at radius 3 of the propeller. This distance 3a—20a is equal to the length of the arc 3a—20, of Fig. 1. Similarly, the distance 10a—20a of Fig. 8 represents the circumferential component of middle radial dimension 10—20 of the area of dynamic pressure, 31, 32, 33, 34, pertaining to the driving face at radius 10 of the propeller, and this distance is equal to the length of the arc 10—20 of Fig. 1, etc. Further, these same distances are represented in 1.7 times the scale of the other figures, at the base line of the pressure diagram, Fig. 7. There, the distance 3a—20 represents the distance 3a—20a of Fig. 8, or the straight line development of the circumferential component of the relative width of the water current, pertaining to blade section 3, and as produced by normal radial projection of the middle radial line of the area of dynamic pressure, on to the outer cylindrical surface corresponding to radius 10 of the propeller. Similarly, the distance 4a—20 of Fig. 7 is equivalent to the distance 4a—20a of Fig. 8, etc., throughout of the Figs. 7 and 8. The curves 3—3h—20, 4—4h—20, 5—5h—20, Fig. 7, are equilateral hyperbolas constructed according to the equation $$P' = P\frac{R_2}{R_1}$$

previously mentioned herein.

The vertical ordinate 3a—3 represents in linear measure, the dynamic pressure generated by the circular deflection of the water current at the driving face of the blade, at radius 3. The ordinate 4a—4 represents similarly the dynamic pressure, generated at the driving face, at radius 4 of the propeller, etc. to ordinate 10—10, which represents the dynamic pressure generated at the driving face, at radius 10 of the propeller. The decimal figures in parentheses at these ordinates, indicate the relative pressure which would be generated at the driving face, at the different radii of the propeller, by the circular deflection of the water current, through a driving face of a cross sectional curvature corresponding to radii, equal to the relative width of the water current pertaining to each blade section. The pressure which would be generated at the radius 10 of the propeller is taken as unity.

The decimal figures, not in parentheses, at these ordinates, indicate the amended or lesser relative pressures generated through the deflection of the water current, by the driving face in which the radii of the cross sectional curvature thereof are a multiple, progressive with the radii of the propeller, of the relative width of the water current pertaining to each blade section, the derivation of the numerical values will be explained in connection with Fig. 10, as explained hereinbefore with reference to the diagram Fig. 6.

In Fig. 7, 3a, 3, 3h, 20, is the pressure diagram for the truncated sectional area of dynamic pressure, 41, 42, 3b, 43 pertaining to radius 3; 4a, 4, 4h, 20 is the pressure diagram pertaining to radius 4, etc., to 10a, 10, 10h, 20, which is the pressure diagram pertaining to radius 10 of the propeller. By means of this original arrangement of the diagram of dynamic pressure, of Fig. 7, and of the normal radial projection of the cross sectional areas of dynamic pressure of Fig. 8, the dynamic pressure in any part of the water current, subject to dynamic pressure, can be readily ascertained or vice versa, the diagram of pressures, Fig. 7, can be used for locating axially and circumferentially the cross sections of the blade, pertaining to the different radii of the propeller, so as to establish a very nearly perfect radial balance of the dynamic pressures, throughout the water current, within active range of the driving face of the blade.

Fig. 9 is a diagram for the graphic determination of the angular position and the width of the blade sections and of the relative width and the velocities of the water current, and of the areas of dynamic pressure. Therein the horizontal line 29—10l is made equal to the circumferential distance of the leading edges of two adjacent blades at radius 10 of the propeller, and at the same time this linear distance is adapted to express the circumferential velocity at radius 10 of the propeller.

The horizontal line 29—9l is made equal to the circumferential distance of the leading edges of the same blades, at radius 9 of the propeller, and at the same time represents the circumferential velocity at radius 9 of the propeller, etc. The vertical line 58—10l represents in the scale of the circumferential velocity the relative axial velocity of the water on entering the propeller. Line 58—59 is parallel to line 29—10l, and therefore the diagonal 59—10l represents the resultant relative velocity, and angle 58, 59, 10l, the relative angle of entrance of the water current into the normal plane of the propeller and, at the same time, the pitch angle at the leading edge and at radius 10 of the blade. The angle 58, 59, 10m, represents the pitch angle at the middle of the blade, and the angle 58, 59, 10e the pitch angle at the edge of egress of the blade at radius 10 of the propeller. Lines 49—10m and 50—10e are parallel to line 29—10l and are drawn through the points of intersection 10m and 10e of the lines 59—10m and 59—10e, with the vertical 58—10e.

By means of the points of intersection, of the vertical lines 9l—9e, 8l—8e, etc., with the horizontal lines 29—10l, 49—10m, 50—10e, and by means of point 59, the pitch angles at the leading edge at the middle and at the edge of egress of the blade at the different radii of the propeller, can be readily found, similarly the velocities of the water current. For example, line 59—4l represents the relative angular velocity of the water current, and 58, 59, 4l the pitch angle at the leading edge of the blade at radius 4 of the propeller 58, 59, 4m, the pitch angle at the middle of the blade and 58, 59, 4e, the pitch angle at the point of egress of the driving face thereof. In this construction, the assumption has been made that the velocity of the water relative to the driving face of the blade remains constant. The dotted circular curve 10l—10o is drawn with the radius 59—10l and from the point 59, as a center, and the line 10b, 10c is drawn parallel to line 29—10l and through the point of intersection 10$b$ of the arc 10$l$—10$o$ with line 59—10$m$. Thereby, the line 10$b$—10$c$ expresses the circumferential velocity of the water current at the middle of blade at radius 10.

The line 10$o$—10$p$ is drawn parallel to line 29—10$l$ and through the point of intersection 10$o$ of the arc 10$l$—10$o$ with the line 59—10$e$. Thereby the line 10$o$—10$p$ expresses the circumferential velocity of the water current at the edge of egress of the blade of radius 10.

Further, the vertical lines 58—10$c$ and 58—10$p$ represent the relative axial velocities of the water current at the middle, and at the edge of egress, of the blade at radius 10 respectively. Further, the vertical lines 10$l$—10$c$ and 10$l$—10$p$ represent the true axial velocities of the water current at the middle, and at the edge of egress of the blade at radius 10 respectively. Further, the chords of the arcs 10$l$—10$b$ and 10$l$—10$o$, not shown, represent the true resultant velocity and direction relative to the leading edge of the blade of the water current at the middle and at the edge of egress of the blade at radius 10 respectively.

In the same manner, the pitch angles and the different velocities and the directions of the water current, can be ascertained for all the other radii of the propeller.

In Fig. 9, the semi-circles 29, 53, 59; 49, 52, 59 and 50, 51, 59 are described from centers located on line X—X and serve for the secondary purpose of drawing normals to the construction lines, terminating at point 59, and for the main purpose of locating the centers of curvature of the cross sectional lines of the driving face of the blade and for finding the relative width of the water current, the width of the blade and the areas of dynamic pressure, pertaining to the different radii of the propeller. For example, by drawing a straight line from point 29, through the point of intersection 53 of the semi-circle 29, 53, 59 and the line 59—4$l$, the line 29—53 represents the relative width of the water current relative to the leading edge, pertaining to the blade section of radius 4 since the line 58—59 was made proportional to the distance between two leading edges; by now describing the radius of curvature of the cross sectional line of the driving face pertaining to radius 4 of the propeller, from the point 29, on to the prolongation of line 29—53, the center of curvature 4$d$ of the driving face line of blade section 4 is found, further, by drawing the line 49—52 through the point 52 of the intersection of the semi-circle 49, 52, 59 with line 59—4$m$, and drawing parallel thereto and through the center 4$d$, the line 4$d$—4, and further, by drawing the line 50—51 through the point of intersection 51 of the semi-circle 50, 51, 59, with line 59—4$e$, and then drawing line 4$d$—55 parallel thereto, and by describing from center 4$d$ the two circular arcs 53—54 and 29—55, we have the cross sectional area of dynamic pressure 53, 54, 55, 29 of which arc 29—55 is the cross sectional line of the driving face, 4$d$—4, the middle radius, and 29—53 the line of entrance, and 54—55 the line of egress, of the water current, pertaining to radius 4 of the propeller. In the same way the centers of curvature 3$d$, 5$d$, etc., and the other elements pertaining to the blade sections of the other radii are determined.

Lines 9—9$d$ and 10—10$d$ indicate only the direction of location of the centers which are beyond the sheet. By drawing line 29—30$a$ through the point of intersection 30, of the semi-circle 29, 53, 59, with line 59—10$l$, then drawing line 50—56 through the point of intersection 56 of the semi-circle 50, 51, 59 with line 59—10$e$, then by drawing dotted line 30—28 through the point 30 and parallel with line 50—56, and by drawing the circular arc 29—28 from the point 30, as center, we have the area of uniform dynamic pressure 28, 29, 30 and the cross sectional line of the driving face 28—29 of the blade of least width pertaining to radius 10, of the propeller, and as shown in Fig. 5 and previously explained.

The diagram, Fig. 10, serves to show the method of ascertaining the radii of curvature of the cross sectional lines of the driving face of the blade, as required for the correct amendment of the pressures throughout the areas of dynamic pressure, pertaining to the different radii of the propeller and it also shows a convenient method for constructing the equilateral hyperbolical curves of the diagram of dynamic pressures. In Fig. 10, the distance 3$a$—20$a$ of the base line 3$a$—4$d$ represents to a scale of 1.166, the circumferential component of the projected middle radial relative width, 3—13 Fig. 8, of the water current.

The vertical ordinate 3$a$—60 represents the pressure generated at radius 3 of the propeller, through the deflection of the water-current, by the driving face of the blade, having a circular curvature, the radius of which is equal to the relative width of the water current. Line 60—69 is parallel to the base line 3$a$—4$d$, and therefore any vertical ordinate terminating on these two lines and located between points 3$a$ and 20$a$ of the base line 3$a$—4$d$, expresses the uniform dynamic pressure generated at any stream line, throughout the area of dynamic pressure, pertaining to that blade section.

The horizontal dimension 3$a$—3$d$ represents the augmented radius of curvature of the driving face of the blade, at radius 3 of the propeller, which in this example is made 1.25 times the linear dimension 3a—20a of the relative width of the water current. By drawing the diagonal 3d—60 and the diagonal 20a—3 parallel thereto, the vertical ordinate 3a—3 from the base to the point 3 of the intersection of lines 20a—3 and 3a—60 expresses the reduced pressure at the driving face of the blade section 3, due to the increased radius of curvature thereof. Lines 61—61, 62—62, etc. are drawn parallel to the base 3a—4d and at random distances from the base line 3a—4d. By drawing the diagonal from point 3d to the point 67 of the intersection of line 67—67, with the vertical 3a—60 and by drawing the vertical line 73—74 from the point of intersection 73 of the diagonals 3d—67 and 20a—3, to the horizontal line 67—67, the point of intersection 74, found, is one of the points of the equilateral hyperbola 3, 3h, 20a or of the pressure curve pertaining to the amended area of dynamic pressure of radius 3 of the propeller. Similarly, by drawing the diagonal 3d—66 and the vertical 71—72 from the point of intersection 71, the point of intersection 72 with line 66 is another point of the hyperbola 3, 3h, 20a, and in the same all the other points thereof are located.

The horizontal distance 20a—4a is equivalent to the distance 20a—4a of Fig. 8, or to the circumferential component of the projected relative width of the water current, at the middle radius of the blade section, pertaining to radius 4 of the propeller.

The vertical line 4a—68, Fig. 10, represents the pressure generated at the radius 4 of the propeller, through the deflection of the water current, by the driving face of the blade having a circular curvature of a radius equal to the relative width of the water current pertaining thereto.

By drawing the diagonal 20a—4 from point 20a to the point of intersection 4 of the vertical 4a—68, with the hyperbola, 3, 3h, 20a, and by drawing parallel thereto the diagonal 68—4d, from the point 68 to the point of intersection 4d with the horizontal 3a—4d, the horizontal distance 4d—4a so found is the augmented radius of curvature of the cross sectional driving face line pertaining to radius 4 of the propeller. In the same constructional manner, the radii of the cross sectional curvature of the driving face of the other blade sections can be easily ascertained. Herein, the basic multiple 1.25 is used to augment the radius of curvature of the driving face line pertaining to radius 3, however, any other greater or lesser multiple may be adopted for that purpose. Nevertheless, good judgment must be used, in the selection of this multiple, for the reason that smaller multiples give a diagram of dynamic pressure, in which the different hyperbolical pressure curves approach each other to a lesser degree than in the diagram, Fig. 7, which corresponds to a lesser degree of radial balance of the dynamic pressures of the water current. By using a larger multiple, however, the widths of the blade, at the outer radii of the propeller, are unnecessarily increased, with the result of a greater power loss, due to the friction of the water current on the larger blade surface.

Having found the augmented radius of curvature, 4a—4d, Fig. 10, the hyperbolical pressure curve 4, 4h, 20a, can be constructed by the same process used for locating the points of the hyperbola 3, 3h, 20a, wherein, however, the diagonals must be drawn from point 4d to the points of intersection of the vertical line 4a—4 with the horizontal lines 61—61, 62—62, etc., and the verticals must be drawn through the points of intersection of the latter diagonals with the diagonal 20a—4.

In the propeller, exemplified herein, the middle of the driving face lines of the blade sections pertaining to the different radii are located on the middle radius 3—13 of the driving face line 3b—43 of the blade section pertaining to radius 3, as evident in Fig. 8. Further, the middles of the apex lines 13, 14, 15, etc., are all located on the same axial plane X—X of Fig. 8, or y—y of Fig. 1. However, these are not essential features of my invention, for the reason that the blade sections pertaining to the different radii may be arranged in different relative positions than those shown in Fig. 8, without perceptibly disturbing the radial balance of the dynamic pressures. For example, the blade section 31—32 can be shifted considerably in parallelism with a line tangent at point 10, Fig. 8, and in like manner two or more of the blade sections may be shifted without materially affecting the radial balance of the dynamic pressures. Further, any one or more of the blade sections may be shifted to a certain degree in parallelism with line X—X of Fig. 8, without disturbing the radial balance of the dynamic pressures, by contemporarily changing the radius of curvature of the cross sectional line of the driving face of the shifted section or sections, so as to reëstablish the radial balance of dynamic pressure. Further, many other variations, which are self-evident to those skilled in the art of engineering, can be made in the relative location of the cross sectional lines of the driving face of the blade, without disturbing the radial balance of pressure and without departing from the basic principle of this invention, namely, the establishment of the radial balance of the dynamic pressure in the areas of pressure pertaining to the different radii of the propeller, by making the radii of curvature of the cross sectional lines of the driving face of the blade a multiple, progressive with the radii of the propeller, of the relative width of the water current pertaining to each blade section. The circumferential velocity of the water current increases slightly from radius 10 to about radius 5, and from there diminishes again toward the axis of the propeller as may be seen by reference to Fig. 9, the velocities referred to being represented by $10p$—$10o$ and $10c$—$10b$ and corresponding lines for other sections.

In Fig. 9, the linear dimension of line $10b$—$10c$, which expresses the actual circumferential velocity of the water current at the middle 10 of the cross sectional line 29—31 of the driving face pertaining to radius 10 of the propeller, is equal to only 0.0369 of the linear dimension 59—$10l$, which is the relative velocity of the water current at radius 10 of the propeller. Therefore, the additional pressure generated by the circumferential motion of the water with the propeller, is very small in comparison with the dynamic pressure generated through the deflection of the water current by the cross sectional curvature of the driving face of the blade, and may be neglected ordinarily. However, in propellers requiring extraordinary refinement and very high efficiency, I compensate for this additional centrifugal pressure by correspondingly reducing the dynamic pressure of the water current through the unequal augmentation of the radii of curvature of each of the cross sectional lines of the driving face of the blade. Thereby, the cross sectional line of the driving face of the blade is changed from a circular curve into a curve decreasing in curvature from the edges of the blade to the point or points of maximum centrifugal pressure. This decrease of curvature involves a corresponding increase of the width of the driving face, which however is so small that it would be hardly perceptible in the cross sections of a blade of the proportions shown herein; likewise, the variation in the cross sectional lines of the driving face from the true circular curvature would be hardly perceptible.

Supposing, that in the propeller of the proportions shown and of the leading pitch and mean pitch mentioned hereinbefore, the cross-sectional lines of the driving face were located so that all the radii of curvature pertaining to the points of mean pitch thereof, would, in the radial projection, Fig. 8, pass through point 10, of the driving face line 31, 32, pertaining to radius 10, of the propeller, then the centrifugal pressure at point 10, can be found by true integration. In that case the centrifugal pressure at point 10 is only 0.0139 of the pressure generated at the same point by the deflection of the water current through the circular curvature of the cross-sectional line of the driving face at radius 10 of the propeller. In that case to compensate for this additional pressure, I increase the radius of curvature of the cross sectional line of the driving face, at point 10, from $2.367D_1$ to $$\frac{2.367}{1-0.0139}D_1 = 2.400D_1,$$

wherein $D_1$ denotes the outer diameter of the propeller at radius 10, and wherein the dynamic pressure at the driving face of blade section 10 is referred to as the unit.

However, in the propeller, as shown herein and in which the cross-sectional lines of the driving face are located by practical judgment rather than in accordance with any mathematical equation, the centrifugal pressures cannot be found by true integration, but must be found by integrating through summation. This I accomplish by means of the diagram, Fig. 8, which readily allows the determination of the radial dimensions of the water current along the different points of the driving face lines of the blade sections. For example, at the point of intersection of the margin line $3b$—42 of the area of dynamic pressure pertaining to radius 3, with the driving face line 31—32, the radial dimension of the water current ranges between the radii 3 and 10, and is therefore equal to 0.7 of the radius of the propeller. At the point of intersection of line 36—37, with the driving face line 31—32, the radial dimension of the water current extends from radius 9 to radius 10, and is therefore equal to 0.1 of the radius of the propeller.

In the same manner, I find the radial dimensions of the water current for the other points of intersection of the driving face line 31—32 with the margin lines of the other areas of dynamic pressure. Then I find by means of diagram 9 the circumferential velocities of the water current at the different radii of the propeller, and along the radial dimension lines of the water current, and by means of these velocities I calculate the centrifugal action at the different radii of the propeller and along these lines.

Further, for each of the radial dimension lines of the water current, I calculate the mean value of the centrifugal action along these lines and from these, together with the density of the liquid medium, I calculate the centrifugal pressures at the different points of the intersection of the driving face lines of the blade sections with the margin lines of the areas of dynamic pressure. By means of the centrifugal pressures so obtained, and the dynamic pressures of the water current, I calculate the augmented radii of curvature required at the different points of intersection of the driving face lines with the margin lines, of the areas of dynamic pressure, in the manner set forth above.

With these augmented radii, I construct a very nearly correct curve for each driving face line, by building the same up of sections of circular arcs, corresponding to the augmented radii calculated as stated.

In the diagram Fig. 11, the curve 29'—31', represents in double the scale of the other drawings, the cross-sectional driving face line of augmented curvature. In proximity thereto is drawn from a center located at the same median radial line and with the radius 2.367 $D_1$, the true circular curve 29, 31 which represents the cross-sectional line of the driving face at radius 10 of the propeller, serves to denote the segments of the curve 29'—31' and time the radii pertaining thereto. The decimal figures 0.000000, 0.000013, 0.0000097 to 0.0000, to the left of the radial lines 0.0, 0.1, 0.2 to 1.0, indicate the relative centrifugal pressures, relating to those points of curve 29'—31', to which these radial lines point. These pressures have been ascertained in the manner explained before and relate to the dynamic pressure pertaining to the driving face at radius 10 as the unit.

The figures 2.36700, 2.36703, 2.36723 on the ends of radial lines 0.0, 0.1, 0.2 to 1.1, indicate in multiples of the propeller diameter $D_1$, the radii of circular curvature of the segments of which curve 29'—31' is composed. 0.35—0.45, 0.45—0.55 indicate the centers of curvature, of the segments of curve 29'—31', which have been shifted 2.15 $D_1$, toward the curve, so as to locate them on the sheet. The radii of arcs 0.0—0.5, 0.5—0.15, 0.15—0.25 and 0.25—0.35 differ so slightly, that for them separate centers could not be located on the drawing and therefore arc 0.0—0.35 of curve 29'—31' is drawn with the primary radius of 2.367 $D_1$.

The center of arm 0.35—0.45 is located on the extension of radial line 0.35 and this arc is drawn with radius 2.36922 $D_1$; the center of arc 0.45—0.55 is located on radial line 0.45 and this arc is drawn with radius 2.37241 $D_1$. In this well known manner the centers of the other segments of curve 29'—31' are located to connect all the segments tangentially, so as to produce an unbroken curve.

It will be noticed that the radii of curvature increase from point 0.0, which is located on the leading edge of the driving face, to the segment 0.85—0.95, on which, at the point 0.9, the centrifugal pressure reaches the maximum of 0.0233 of the dynamic pressure. There the segment 0.85—0.95 has the greatest radius of 2.42347 $D_1$, however from there to point 1.0, which is located at the line of egress of the driving face, the centrifugal pressure drops to zero and the segment 0.95—10 is made of the original circular curvature of 2.367 $D_1$. The different segments 0.05—0.15, 0.15—0.25 of curve 29'—31', are not made of the same length, but vary in length in direct ratio of the radii of curvature, so as to preserve the original axial pitch ratios throughout of the driving face lines. This results in a slight increase of the width of the driving face, which is evident in comparing the length of the driving face line 29'—31' with the length of the driving face line 29—31, which is of constant curvature, corresponding to radius 2.367 $D_1$, throughout.

On close inspection it will be seen that curve 29'—31', approaches the circular arc 29—31 toward the points of egress.

The radii of curvature of the different segments of the curve 29'—31', have been calculated in the manner explained already previously, namely the radius of curvature for any part of the curve is equal to the quotient of the original radius of curvature and the difference of the dynamic pressure and the centrifugal pressure at that point.

The radius R, of curvature at point 0.9 of the curve is, $$R = \frac{2.367 D_1}{1 - 0.0233} = 2.42347 D_1.$$

The curvatures of the cross-sectional driving face lines, pertaining to the other radii may be readily found through the same process given above, except that the part of the driving face near the hub does not require a change from true circular curvature, because there the centrifugal pressure is zero.

In the diagram, Fig. 12, the base line 0.0, 1.0, corresponds to the linear dimension of the arc 29—31 of Fig. 11, the driving face line of circular curvature at radius 10 of the propeller.

The decimal figures, 0.1, 0.2, 0.3 to 1.0 are ten equal abscisses, equivalent to ten equal sections of the arc 29—31, of Fig. 11. The vertical ordinates, drawn from the decimal figures at the base line 0.0, 1.0, to curve C, are proportional to the centrifugal action at points of equal division, of the driving face line 29—31. The vertical ordinates from base line 0.0 to 0.1 to curve Q, are the ordinates of a true quadratic curve. The ordinate at point 1.0 of the base line 0.0, 1.0, is the same for both, curve C and curve Q. This diagram, Fig. 12, serves to show that the centrifugal action of the water current increases from zero, at the point 0.0 of the leading edge of the cross-sectional line of the driving face of the blade, toward the point 1.0, of egress thereof, very nearly as the square of the angular distance of any point from the leading edge of the blade. This feature can be made use of, for saving time, in calculating the centrifugal action at the intermediate points of the driving lines.

The blade shrouding 25, as shown herein, corresponds in form and area exactly to the area of dynamic pressure 31, 32, 33, 34, Figs. 6 and 8 of radius 10 of the propeller, and serves to retain the dynamic pressure and the water current within the limits of the cylindrical space, conforming to the outer radius of the propeller. However, I do not limit my claims pertaining thereto to a shrouding of the exact size of the outer area of dynamic pressure, for the reason that in some cases I make the same somewhat larger, by adding to one or more of the edges thereof, a safety margin for the purpose of compensating for inaccuracies of workmanship, and for taking care of distortions of the area of dynamic pressure caused by waves. Further, when compelled by limitation of space in the axial direction, i. e., by the insufficient distance between the stern and rudder posts of a ship, I omit part of the rear wing of the shrouding 25, by truncating it on a line of normal axial plane, instead of the curve 33—34, Fig. 6. This is indicated by means of the line T—T of Fig. 4. In some cases, namely, where the space in the axial direction is too small, or where the rotative speed or the dynamic pressure of the water current are too great to permit the application of the blade shrouding 25, I omit the same, and then make use of the outer stationary shrouding 27, to prevent the radial escape of water from the outer area of dynamic pressure.

Herein, I have explained my invention by means of a propeller, in which the pitch of the leading edge and of egress of the blade is constant radii, and likewise I have referred to a propeller with four blades. These, however, are details, which may be varied without departing from the principle of my invention. Further, I do not limit the claims pertaining to this invention to a propeller in which the lines of the driving face, in the plane development of the co-axial cylindrical cross sections thereof are of concave curvature, because I have found that blades of true helical pitch, in which the cross sectional pitch lines thereof correspond in width and in the relative axial and circumferential location to the chords of the curved pitch lines of the propeller described herein, act like blades, having a concave driving face, deflect the water current in circular stream lines and produce the radial balance of the dynamic pressures, although imperfectly so.

In carrying out the construction of my propeller and in making the necessary calculations required for determining the dimensions, rotative speed, thrust pressure and the power required for its operation, it is essential to carefully take into account the velocity of the drag water or the initial forward velocity of the water on entering the propeller, which is partly due to the skin friction and partly due to the body resistance of the ship.

I have found that the thrust pressure of the propeller decreases with the increase of the velocity of the drag water, however, that the efficiency of my propeller increases with the velocity of the drag water so much as to give, under favorable conditions, apparent efficiencies of considerably more than one hundred per cent., where apparent efficiency is understood to express the quotient of the actual power required to tow the ship and the power delivered at the hub of the propeller.

Having explained the construction and operation of my propeller in reference to its application for ship propulsion and in reference to its action in water, I do not limit my claims to that purpose, for the reason that it is advantageously applicable to a great variety of devices, as flying machines, fans, rotary pumps, air compressors and steam, gas and air turbines, used for the generation of power.

My propeller is very efficient within a very great range of pitch angles, and it can be used with very small pitch angles and high rotative speeds, without a material reduction of its high efficiency. It is particularly suitable for the propulsion of ships, by means of steam turbine motors, because it can be efficiently operated under the higher rotative speeds essential for the most economical performance of the latter. Further my propeller works without pumping action and therefore does not add to the stern resistance of the ship.

I am not aware that the almost perfect balance of the dynamic pressures within the water current has been attempted or accomplished in the manner disclosed herein, and, therefore, I claim, particularly, as novel and basic, that feature of my invention which consists in the special selection of the curvature of the cross sectional lines of the driving face of the blade, the radii of curvature of which are a multiple, progressive with the radii of the propeller, of the relative width of the water current pertaining to each cross sectional line of the driving face.

Having thus described my invention, what I claim and desire to secure by Letters Patent of the United States, is:

1. In a rotary propeller, a propeller blade having a driving face with a pitch increasing axially from the leading edge rearwardly and in continuation thereof, an extension of the blade near the hub portion thereof having a constant pitch.

2. In a rotary propeller, a propeller blade having a driving face with a pitch increasing axially from the leading edge rearwardly, the ratio of pitch increase decreasing in the co-axial cylindrical cross sectional lines of the driving face from the leading edge toward the longitudinal line of maximum centrifugal pressure of the blade.

3. In a rotary propeller, a propeller blade having a driving face with a pitch increasing from the leading edge rearwardly, the rate of increase axially decreasing in the co-axial cylindrical cross sectional lines of the driving face from the longitudinal line of maximum centrifugal pressure of the blade rearwardly.

4. In a rotary propeller, a propeller blade having a driving face with a pitch increasing axially from the leading edge rearwardly, the rate of increase of pitch decreasing in the co-axial cylindrical cross sectional lines of the driving face from the leading edge to the longitudinal line of maximum centrifugal action of the blade and then increasing again rearwardly.

5. In a rotary propeller, a propeller blade having the curvature of the cross sectional lines of the driving face of the blade, the radii of curvature of which being made multiples of the cross sectional width of the water current operated on by the blade, increasing with the radii of the propeller to rectify the dynamic pressures and to establish, or partially establish, a radial balance of the dynamic pressures throughout the water current.

6. In a rotary propeller, a propeller blade having a driving face of axial pitch increasing from the leading edge toward the edge of egress in the co-axial cylindrical cross sectional lines thereof, the radii of curvature of which are a multiple, increasing with the radii of the propeller, of the relative widths of the water current pertaining to the said cross sectional lines of the driving face of the blade.

7. In a rotary propeller, a propeller blade having a driving face of an axial pitch increasing from the leading edge toward the edge of egress in the co-axial cylindrical cross sectional lines thereof, the radii of curvature of which are a multiple, increasing with and in a greater ratio than the radii of the propeller, of the relative widths of the water current pertaining to the said cross sectional lines of the driving face of the blade.

8. In a rotary propeller, a propeller blade having a driving face, the body portion of which is of increasing pitch and having a width increasing in the co-axial cylindrical cross-sectional lines thereof in a greater ratio than the ratio of increase of the radii of the propeller pertaining thereto, and a shrouding on the outer edge of the blade, said shrouding having a form and an area equal to or approximately equal to the area of dynamic pressure pertaining to the driving face line of the blade at the outer radius of the propeller.

9. In a rotary propeller, a propeller blade having a driving face, the body portion of which is of increasing axial pitch and having a width increasing in the co-axial cylindrical cross-sectional lines thereof in a greater ratio than the ratio of increase of the radii of the propeller pertaining thereto, and a stationary cylindrical shrouding surrounding the propeller.

10. In a rotary propeller, a propeller blade having a driving face, the body portion of which is of increasing axial pitch and has a width increasing in co-axial cylindrical cross-sectional lines thereof in a greater ratio than the ratio of increase of the radii of the propeller pertaining thereto, and a shrouding on the outer edge of the blade, said shrouding having an area equal to or approximately equal to the area of dynamic pressure pertaining to the driving face line of the blade at the outer radius of the propeller, and a stationary cylindrical shrouding surrounding the propeller.

11. In a rotary propeller, a propeller blade having a driving face of an axial pitch increasing from the leading edge toward the edge of egress in the co-axial cylindrical cross sectional lines thereof, the radii of curvature thereof being a multiple, increasing with the radii of the propeller, of the relative widths of the water current pertaining to the said cross sectional lines of the driving face, which are arranged in axial and circumferential relation to each other so as to establish or approximately establish the radial balance of the dynamic pressures throughout the water current.

12. In a rotary propeller, a propeller blade having a driving face of an axial pitch increasing from the leading edge toward the edge of egress in the co-axial cylindrical cross sectional lines thereof, the radii of curvature of which are a multiple, increasing with and in a greater ratio than the radii of the propeller, of the relative widths of the water current pertaining to said cross sectional lines of the driving face, which are arranged in an axial and circumferential relation to each other, so as to establish or approximately establish the radial balance of the dynamic pressures throughout the water current.

13. In a rotary propeller, a propeller blade having a driving face of an axial pitch increasing from the leading edge toward the edge of egress in the co-axial cylindrical cross sectional lines thereof, the radii of curvature of which are a multiple, increasing with the radii of the propeller, of the relative widths of the water current pertaining to the said cross sectional lines of the driving face, which are arranged axially and circumferentially, to locate the areas of dynamic pressure pertaining to the different cross sections of the driving face, so as to establish or approximately establish the radial balance of the dynamic pressures throughout the water current.

14. In a propeller, a propeller blade having a driving face of increasing axial pitch, with the edge of egress of said driving face having a constant axial pitch substantially throughout the length thereof.

In testimony whereof I have signed my name to this specification in the presence of two subscribing witnesses.

CARL THEODOR AUGUST HERMANN WIEDLING.

Witnesses:
W. W. HOLT,
EDWARD B. MARSHALL.